United States Patent
Yao et al.

(10) Patent No.: US 8,925,820 B2
(45) Date of Patent: Jan. 6, 2015

(54) STORED-VALUE CONTAINER

(71) Applicants: Po-Hung Yao, Hsinchu County (TW); Wei-Chung Chao, Hsinchu County (TW)

(72) Inventors: Po-Hung Yao, Hsinchu County (TW); Wei-Chung Chao, Hsinchu County (TW)

(*) Notice: Subject to any disclaimer, the term of this patent is extended or adjusted under 35 U.S.C. 154(b) by 0 days.

(21) Appl. No.: 13/827,749

(22) Filed: Mar. 14, 2013

(65) Prior Publication Data

US 2013/0270142 A1    Oct. 17, 2013

(30) Foreign Application Priority Data

Apr. 13, 2012 (TW) .............................. 101206750 U

(51) Int. Cl.
G06K 19/00 (2006.01)
B65D 25/00 (2006.01)
A47G 19/22 (2006.01)
G06Q 20/28 (2012.01)
G06Q 20/32 (2012.01)

(52) U.S. Cl.
CPC ............ *B65D 25/00* (2013.01); *A47G 19/2227* (2013.01); *G06Q 20/28* (2013.01); *G06Q 20/3278* (2013.01)
USPC ............................ 235/451; 235/435; 235/439

(58) Field of Classification Search
USPC ............ 235/435, 439, 451, 487, 492; 340/10, 340/572
See application file for complete search history.

(56) References Cited

U.S. PATENT DOCUMENTS

2005/0242957 A1* 11/2005 Lindsay et al. ............. 340/572.7
2009/0020613 A1* 1/2009 Chang et al. .................. 235/492
2011/0226636 A1* 9/2011 Petti .............................. 206/216

* cited by examiner

*Primary Examiner* — Matthew Mikels
(74) *Attorney, Agent, or Firm* — Rabin & Berdo, P.C.

(57) ABSTRACT

A stored-value container has a body and a stored-value chip mounted on the body. The stored-value chip stores payment information for transaction deduction after being read by an external device. When using the stored-value container to buy beverage, instead of paying with cash or a stored-value card, a consumer can hand the stored-value container to a store clerk to finish payment directly through the stored-value chip. Accordingly, with the stored-value container, consumers can finish the purchasing procedure quickly without carrying cash or a stored-value card and also take environmental protection into account.

12 Claims, 7 Drawing Sheets

STORED-VALUE CONTAINER

BACKGROUND OF THE INVENTION

1. Field of the Invention

The present invention relates to a container and more particularly to a stored-value container.

2. Description of the Related Art

Constantly expanding urbanization gives rise to increasing dining-out demand. To allow customers to have take-out food and drink conveniently and reduce the cost, most restaurants and stores prepare one-time-use disposable food and drink containers. Although disposable food and drink containers have their market demand, enormous amount of discarded disposable containers is the main cause of environmental pollution. In answer to the environmental protection awareness, reusable containers promoted by the government of every country have been gradually accepted by consumers.

When intending to buy a cup of coffee, tea or the like from a store or a restaurant, a consumer can ask a clerk to fill the beverage in a portable reusable container, thereby effectively reducing the use of disposable containers and achieving the purpose of environmental protection.

With reference to FIG. 7, when buying food or beverage from stores or restaurants, consumers are accustomed to paying with cash, a credit card 84, a stored value card 82 or the like. Hence, for the sake of environmental protection, consumers also need to carry a personal reusable container 83 besides cash, credit card, stored value card or the like. However, additional items certainly cause inconvenience when carried along by consumers, and such inconvenience will lower consumers' willingness to use the reusable container 83.

Furthermore, when paying for food or beverage, a consumer usually needs to find a place to put his/her reusable container 83 so as to leave his/her hands free to get the required cash or a stored value card 82 from a wallet or a purse. When paying with a stored value card 82, the consumer further needs to place the stored value card 82 on a sensing device 81 of a cash register machine 80 and put the stored value card 82 back to the wallet or purse after the payment is deducted from the stored value card 82. Meanwhile, the consumer still needs to hand the reusable container 83 to a clerk and finishes the purchasing process until the clerk places the food or fills the beverage in the reusable container 83. However, such purchase involves a busy paying process and keeps reluctant consumers away from the use of the reusable container 83.

SUMMARY OF THE INVENTION

An objective of the present invention is to provide a stored-value container for ensuring environmental protection regarding the use of a reusable container and mitigating the inconvenience of using cash or a stored-value card for payment.

To achieve the foregoing objective, the stored-value container has a body and a stored-value chip.

The body has a bottom.

The stored-value chip is mounted on the body and stores payment information.

In view of the stored-value chip mounted on the body of the stored-value container and storing payment information, a sensing device of a store or a restaurant can add or deduct value to or from the stored-value chip. When a consumer intends to buy beverage from a store, the stored-value container can be used to contain the purchased beverage and finish payment. Accordingly, consumers can finish payment for purchase without additionally carrying a stored-value card or cash and environmental protection can surely be accomplished when using such reusable stored-valued container become a part of mass consumer culture.

Other objectives, advantages and novel features of the invention will become more apparent from the following detailed description when taken in conjunction with the accompanying drawings.

DETAILED DESCRIPTION OF THE INVENTION

Figure 1:
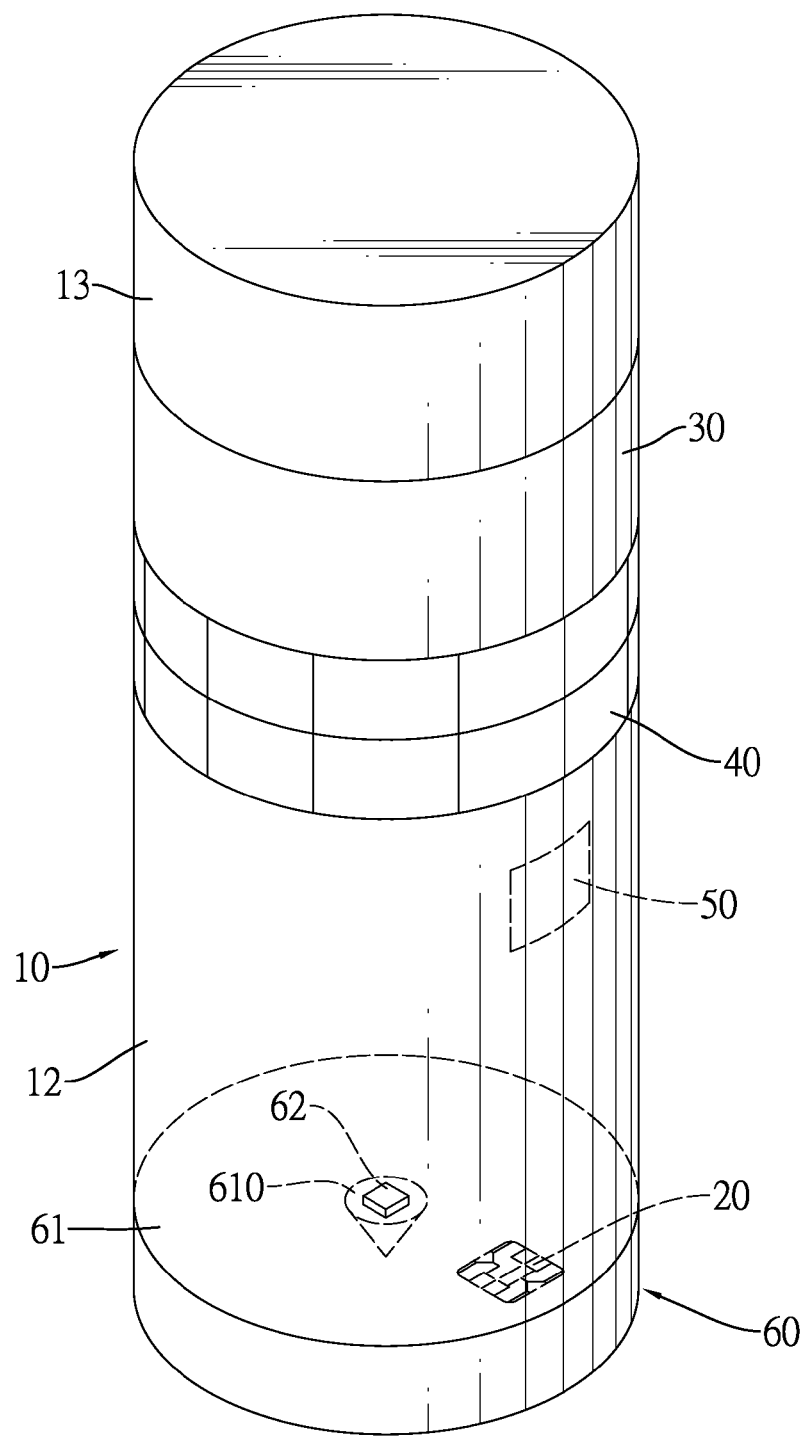
FIG. 1 is a perspective view of a stored-value container in accordance with the present invention.
Figure 2:
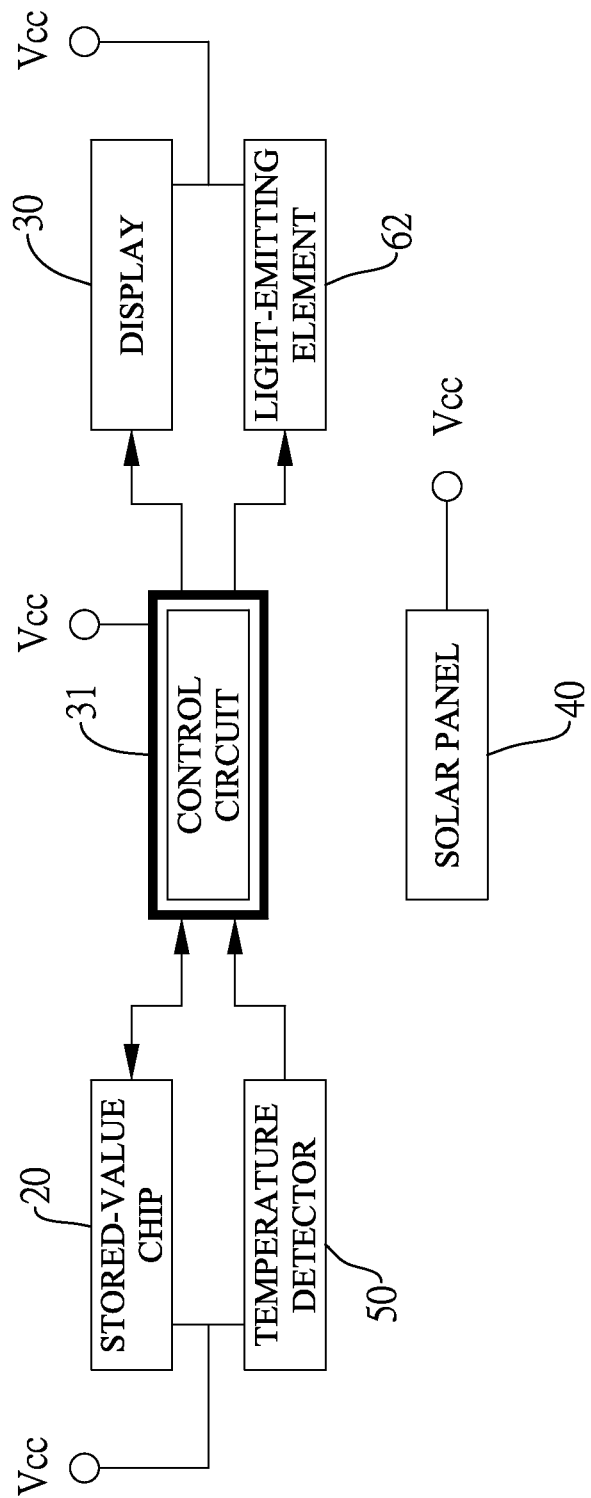
FIG. 2 is a functional block diagram of the stored-value container in FIG. 1.
Figure 4:
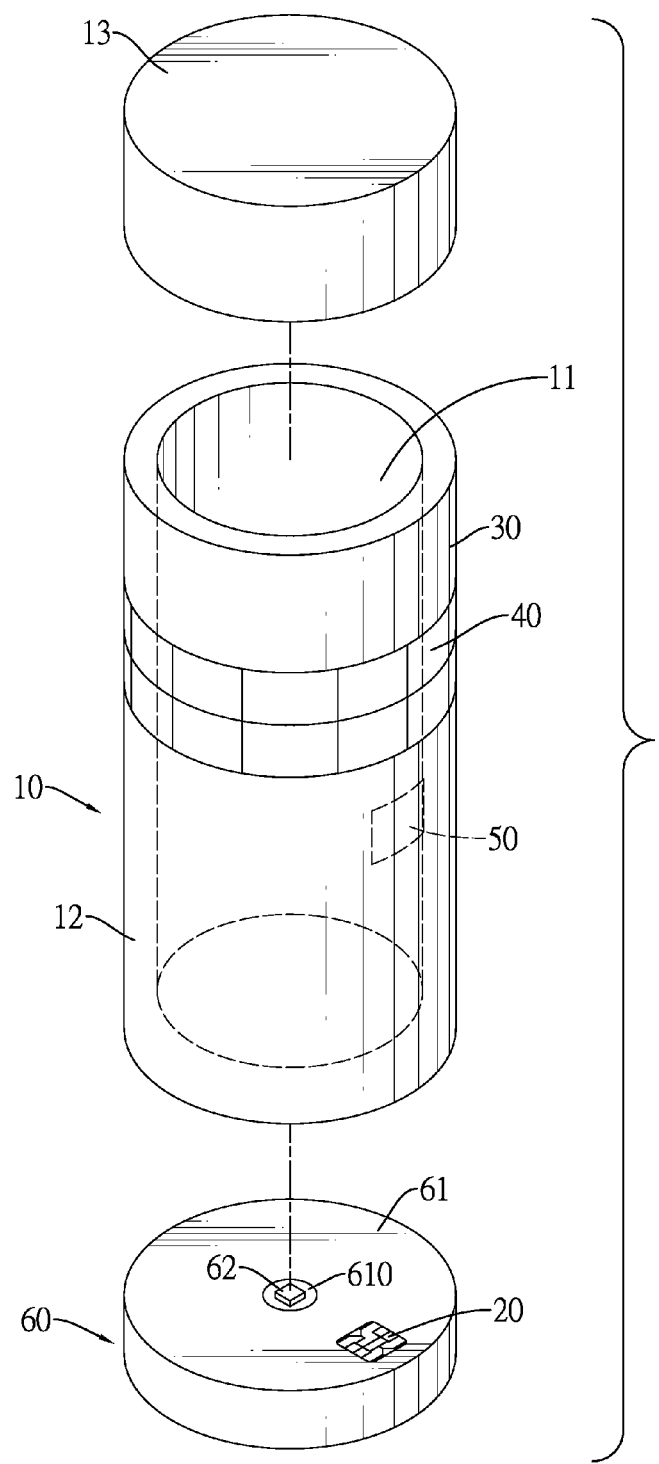
FIG. 4 is a partially exploded perspective view of the stored-value container in FIG. 1.

With reference to FIGS. 1, 2 and 4, a stored-value container in accordance with the present invention has a body 10, a stored-value chip 20, a display 30 and a solar panel 40.

In the present embodiment, the body 10 has a cup 12 and a lid 13. The cup 12 has a chamber 11 defined therein. The lid 13 is detachably mounted on the cup to seal the chamber 11 along with the cup 12.

The stored-value chip 20 is mounted on the body 10 and stores payment information. In the present embodiment, the stored-value chip 20 is a radio frequency identification (RFID) chip. The payment information may contain identification number and remaining value. Besides, the stored-value chip may store consumer information, such as names, transaction records and the like, and container information, such as model number, size, containing capacity and the like.

The display 30 is mounted on an outer wall of the cup 12 of the body 10 and is electrically connected to the stored value chip 20 through a control circuit 31. The display 30 serves to display a part or all of the payment information. In the present embodiment, the control circuit 31 is integrated in the display 30. The display 30 may be a flexible display including, but not limited to, a liquid crystal display, an electronic ink display, an electroluminescent (EL) display or an LED display.

The solar panel 40 is mounted on the outer wall of the cup 12 of the body 10, and is electrically connected to the stored-value chip 20, the display 30 and the control circuit 31 to provide an operating power to the stored-value chip 20, the display 30 and the control circuit 31. As long as there is light in the ambient environment, the solar panel 40 can convert the energy of light into electricity to supply power to the display 30 for displaying.

Figure 3:
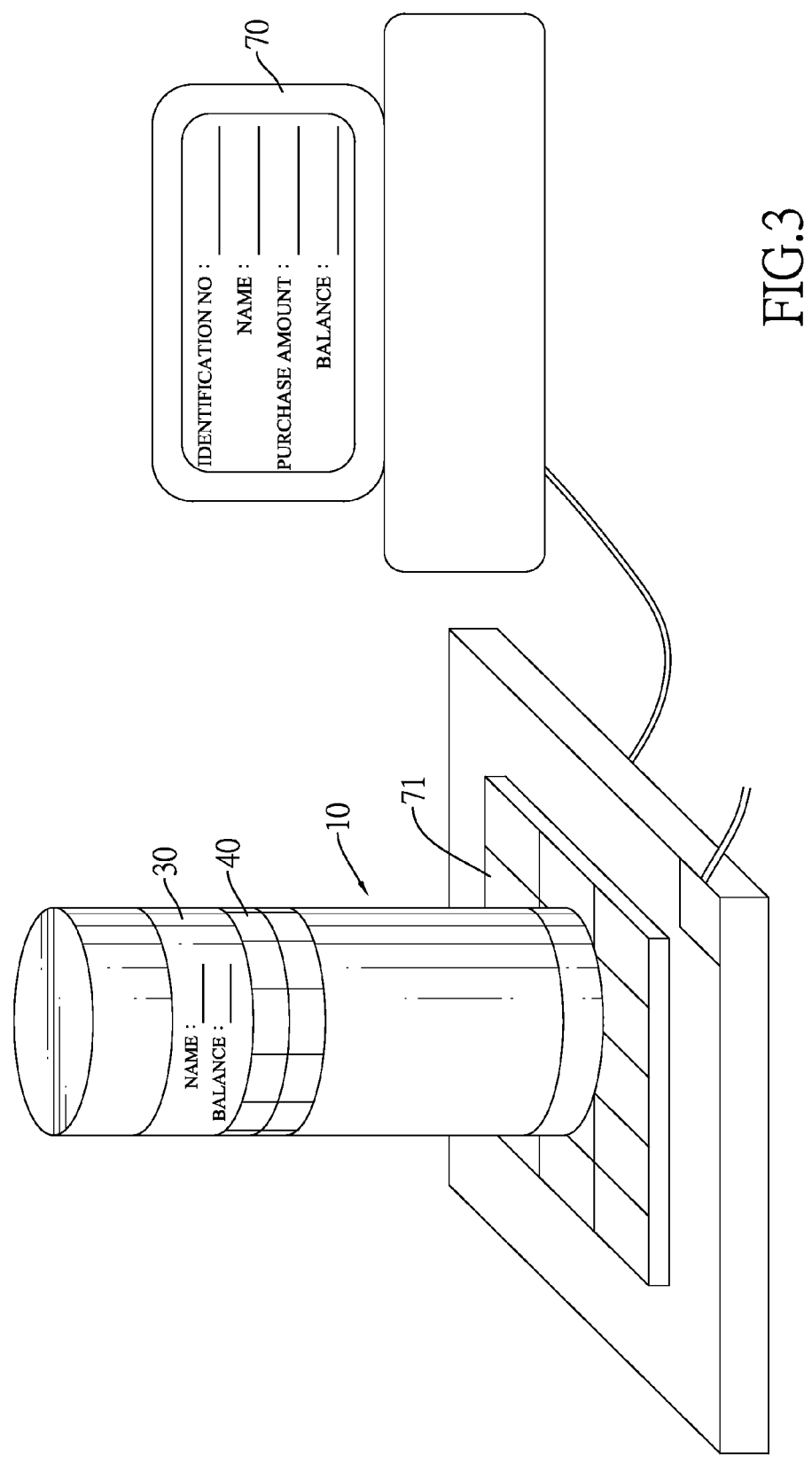
FIG. 3 is an operational schematic view of the stored-value container in FIG. 1 when used for payment.

With reference to FIG. 3, when a consumer enters a store to conduct a transaction, the stored-value container is placed on a cash register machine 70 having a sensing device 71. The store can access the payment information of the stored-value chip 20 through the sensing device 71. Here are two examples for explaining an actual payment deduction process of a stored-value card.

1. If the payment information stored in the stored-value chip 20 is a stored value, the store read the stored value through the sensing device 71. After the stored value is successfully read, the payment amount of a current transaction is deducted from the stored value, and the remaining value is stored in the stored-value chip again to pay for subsequent transactions.

2. If the payment information stored in the stored-value chip 20 is an identification number, the cash register machine 70 of the store is built in with a database containing the identification number and a stored value associated with the identification number. The store reads the identification number in the stored-value chip 20 through the sensing device 71. After the identification number is successfully read, the stored value corresponding to the identification number can be read from the database and a payment amount of a current transaction is deducted from the stored value, and the stored value associated with the identification number in the database is updated by the remaining value to pay for subsequent transactions.

Besides being an RFID chip, the stored-value chip 20 may be an integrated circuit card, which is mounted on a bottom of the body 10 and is contacted with the sensing device 71 for the sensing device 71 to access the stored-value chip 20.

Figure 5:
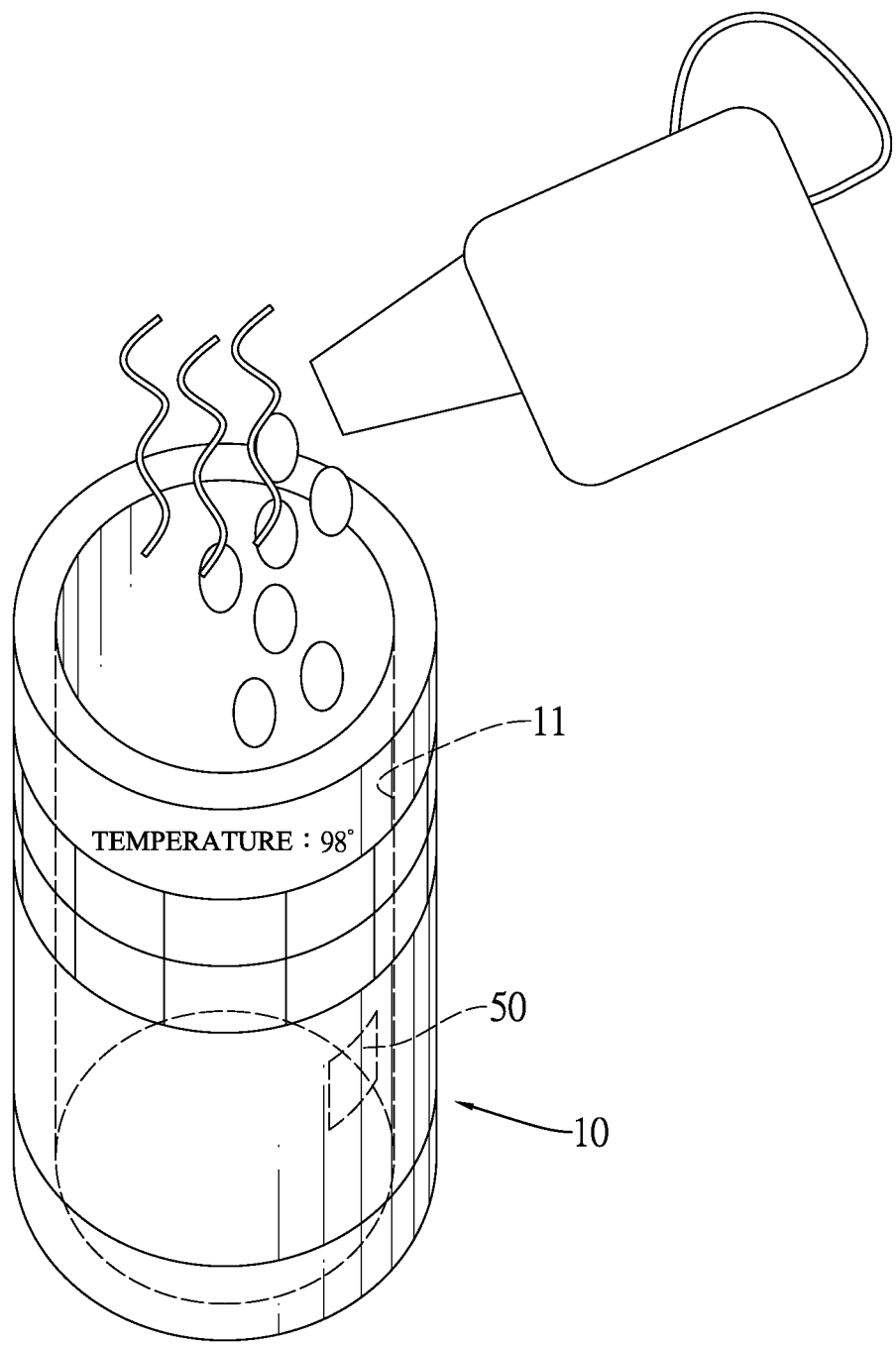
FIG. 5 is an operational schematic view of the stored-value container in FIG. 1 when detecting temperature.

Furthermore, due to the mushrooming and widespread coffee shops and beverage stores, the stored-value container of the present application has more opportunities to contain hot drinks. With reference to FIGS. 4 and 5, to avoid mouth burn when drinking hot drinks, the stored-value container of the present invention further has a temperature detector 50 mounted on an inner wall of the body 10 and is electrically connected to the control circuit 31 and the solar panel 40. After detecting a temperature inside the chamber 11 of the body 10, the temperature detector 50 outputs a temperature-sensing signal to the control circuit 31. After converting the temperature-sensing signal into temperature data, the control circuit 31 drives the display 30 to display a current temperature inside the chamber 11 according to the temperature data. Hence, consumers can be aware of the temperature of the hot drink currently contained in the chamber 11 to avoid the risk of mouth burn.

Figure 6:
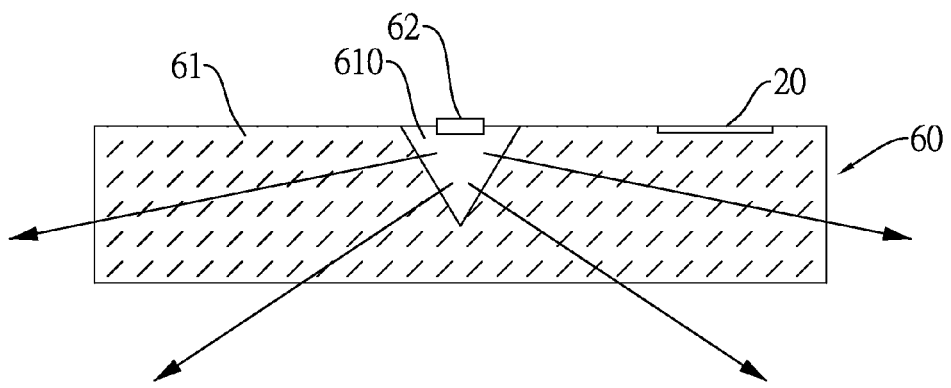
FIG. 6 is a schematic cross-sectional view of a color-changing plate of the stored-value container in FIG. 1.
Figure 7:
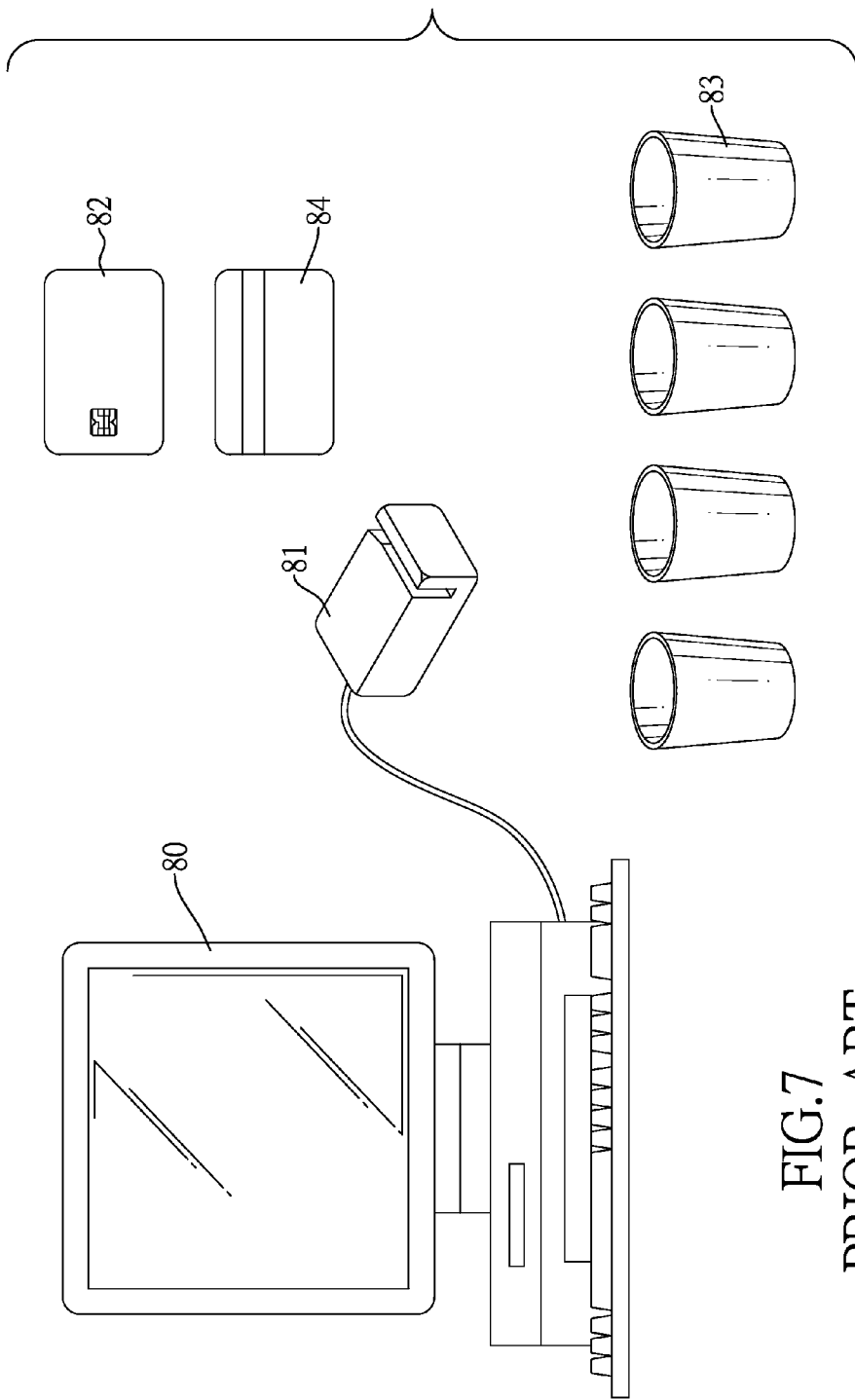
FIG. 7 is a schematic view of conventional payment means.

Besides the temperature indicator 50 collaborated with the display 30 for reminding consumers of the temperature of a hot drink contained in the chamber 11 of the body 10, the stored-value container can further intuitively remind consumers of the temperature of a hot drink contained in the chamber 11 through the illumination of different colored lights. With reference to FIGS. 4 and 6, the body 10 further has a color-changing plate 60 mounted on a bottom of the cup 12, changing the intensity and color of lights according to the temperature sensed inside the chamber 11, and having a light guide 61 and a light-emitting element 62. The light guide 61 is mounted on the bottom of the cup 12 and has an inverted cone-shaped recess 610 centrally formed in a top of the light guide 61. The light-emitting element 62 is mounted in the inverted cone-shaped recess 610 of the light guide 61 and is electrically connected to the control circuit 31 and the solar panel 40. In the present embodiment, the light-emitting element 62 is a light-emitting diode. Lights emitted by the light-emitting element 62 are scattered and transmitted out of the body 10 through the light guide 61. By adjusting a cone angle of the inverted cone-shaped recess 610, a light distribution of the color-changing plate 60 is controllable.

Hence, when receiving the temperature-sensing signal outputted from the temperature detector 50, the control circuit 31 converts the temperature-sensing signal into corresponding temperature data, and drives the light-emitting element 62 of the color-changing plate 60 to emit light with a corresponding intensity and color. For example, if the temperature detected inside the chamber 11 is 98° C., it represents a high temperature inside the chamber 11 and the light-changing plate 60 emits red light, and if the temperature detected inside the chamber 11 is 10° C., it represents a low temperature inside the chamber 11 and the light-changing plate 60 emits blue light. Accordingly, consumers can be intuitively aware of the temperature inside the stored-value container by directly observing the color of light emitted from the color-changing plate 60. Moreover, the display of colorful lights through the color-changing plate adds aesthetic appeal of the stored-value container.

In sum, the stored-value container of the present invention has the following advantages:

1. Fast payment: The sensing device of the store can add or deduct the stored value in the stored-value chip.

2. Environmental protection: Due to the reusable nature, the stored-value container is environment-protective.

3. Drinking safety: In view of the display and the color-changing plate capable of indicating the temperature inside the chamber of the stored-value container, consumers can be alerted when drinking hot beverage contained in the stored-value container.

4. Aesthetic attraction: Colorful lights displayed by the color-changing plate of the body increase aesthetic appeal of the stored-value container.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A stored-value container comprising:
   a body having:
      a cup having a bottom, and a chamber defined in the cup;
      a color-changing plate mounted on the bottom of the cup and defining a bottom of the body, an intensity and a color of light emitted from the color-changing plate changing according to a temperature sensed inside the chamber of the cup, the color-changing plate including:
         a light guide mounted on the bottom of the cup and having an inverted cone-shaped recess centrally formed in a top of the light guide; and
         a light-emitting element mounted in the inverted cone-shaped recess of the light guide; and
      a lid detachably mounted on the cup to seal the chamber along with the cup;
   a stored-value chip mounted on the body and storing payment information;
   a display mounted on an outer wall of the body, electrically connected to the stored value chip through a control circuit, and serving to display the payment information;
   a solar panel mounted on the outer wall of the body, and being electrically connected to the stored-value chip, the display and the control circuit, the light-emitting element being electrically connected to the control circuit and the solar panel; and
   a temperature detector mounted on an inner wall of the body, electrically connected to the control circuit and the solar panel, detecting the temperature inside the chamber of the body, and outputting a temperature-sensing signal to the control circuit for the control circuit to convert the temperature-sensing signal into temperature data and drive the display to display a current temperature inside the chamber according to the temperature data.

2. The stored-value container as claimed in claim 1, wherein the payment information is a stored value.

3. The stored-value container as claimed in claim 1, wherein the payment information is an identification number.

4. The stored-value container as claimed in claim 1, wherein the stored-value chip stores consumer information and container information.

5. The stored-value container as claimed in claim 1, wherein the stored-value chip is a radio frequency identification (RFID) chip.

6. The stored-value container as claimed in claim 1, wherein the stored-value chip is an integrated circuit card mounted on the bottom of the body.

7. The stored-value container as claimed in claim 1, wherein the light-emitting element is a light-emitting diode.

8. The stored-valve container as claimed in claim 1, wherein the control circuit is integrated in the display.

9. The stored-value container as claimed in claim 1, wherein the display is a flexible display.

10. The stored-value container as claimed in claim 7, wherein the display is one of a liquid crystal display, an electronic in display, an electroluminescent (EL) display and an LED display.

11. The stored-valve container as claimed in claim 7, wherein the display is a flexible display.

12. The stored-value container as claimed in claim 11, wherein the display is one of a liquid crystal display, an electronic ink display, an EL display and an LED display.

* * * * *